United States Patent [19]
Unkrich et al.

[11] Patent Number: 6,141,674
[45] Date of Patent: Oct. 31, 2000

[54] REDUCING THE HARDWARE COST OF A BANK OF MULTIPLIERS BY COMBINING SHARED TERMS

[75] Inventors: Mark A. Unkrich, Redwood City; Adisak Mekkittikul, Mountain View, both of Calif.

[73] Assignee: Hewlett-Packard Company, Palo Alto, Calif.

[21] Appl. No.: 09/095,533

[22] Filed: Jun. 10, 1998

[51] Int. Cl.[7] .................................................. G06F 7/52
[52] U.S. Cl. .................................... 708/628; 708/319
[58] Field of Search ........................... 708/628, 629, 708/630, 631, 632, 319

[56] References Cited

U.S. PATENT DOCUMENTS

| | | | |
|---|---|---|---|
| 4,745,570 | 5/1988 | Diedrich et al. | 708/631 |
| 4,799,183 | 1/1989 | Nakano et al. | 708/629 |
| 5,646,877 | 7/1997 | Mahant-Shetti et al. | 708/628 |
| 5,680,335 | 10/1997 | Ikeyama et al. | 708/319 |
| 5,781,462 | 7/1998 | Yamanaka et al. | 708/319 |

*Primary Examiner*—David H. Malzahn

[57] ABSTRACT

A circuit that performs the function of a bank of multipliers while reducing hardware costs includes shared term generator that generates a set of shared terms in response to an input value. The circuit further includes a set of combining circuits each of which generates a result term by combining one or more of the shared terms so that the result term equals the input value multiplied by a corresponding data value. The circuit generates the share terms once and then reuses the shared terms in differing combining circuits as needed thereby eliminating duplication of terms and associated implementation hardware.

25 Claims, 4 Drawing Sheets

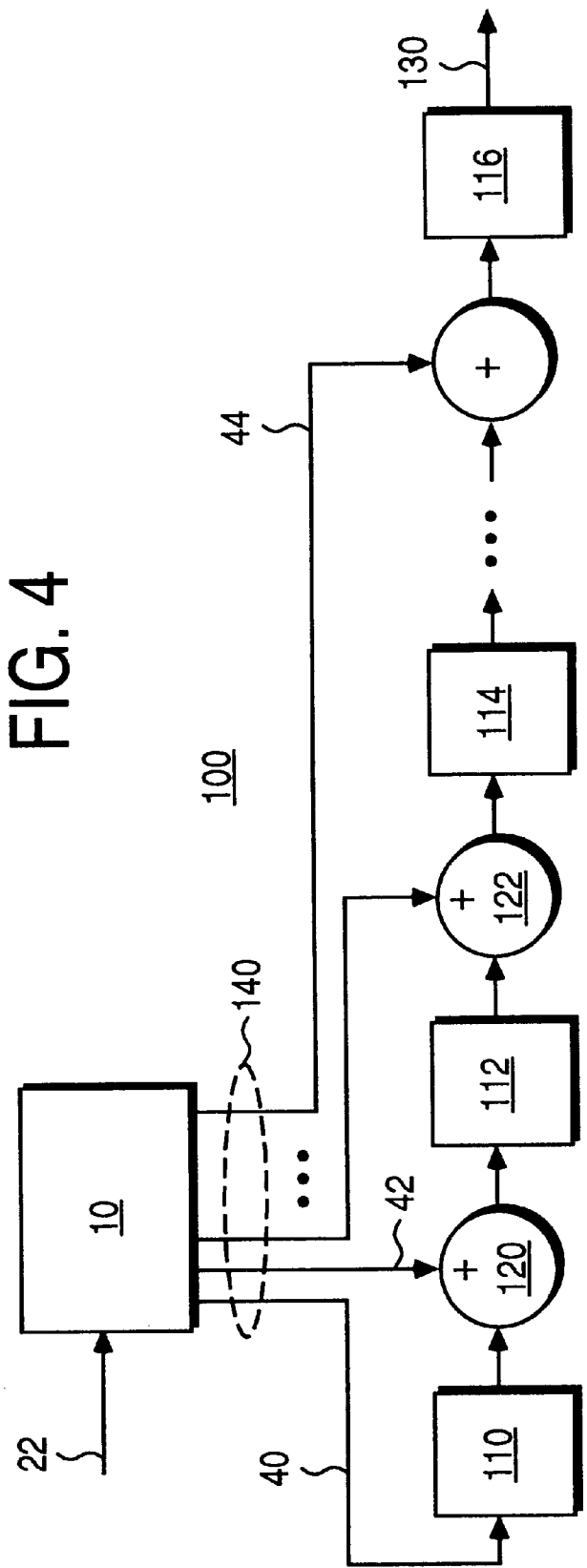

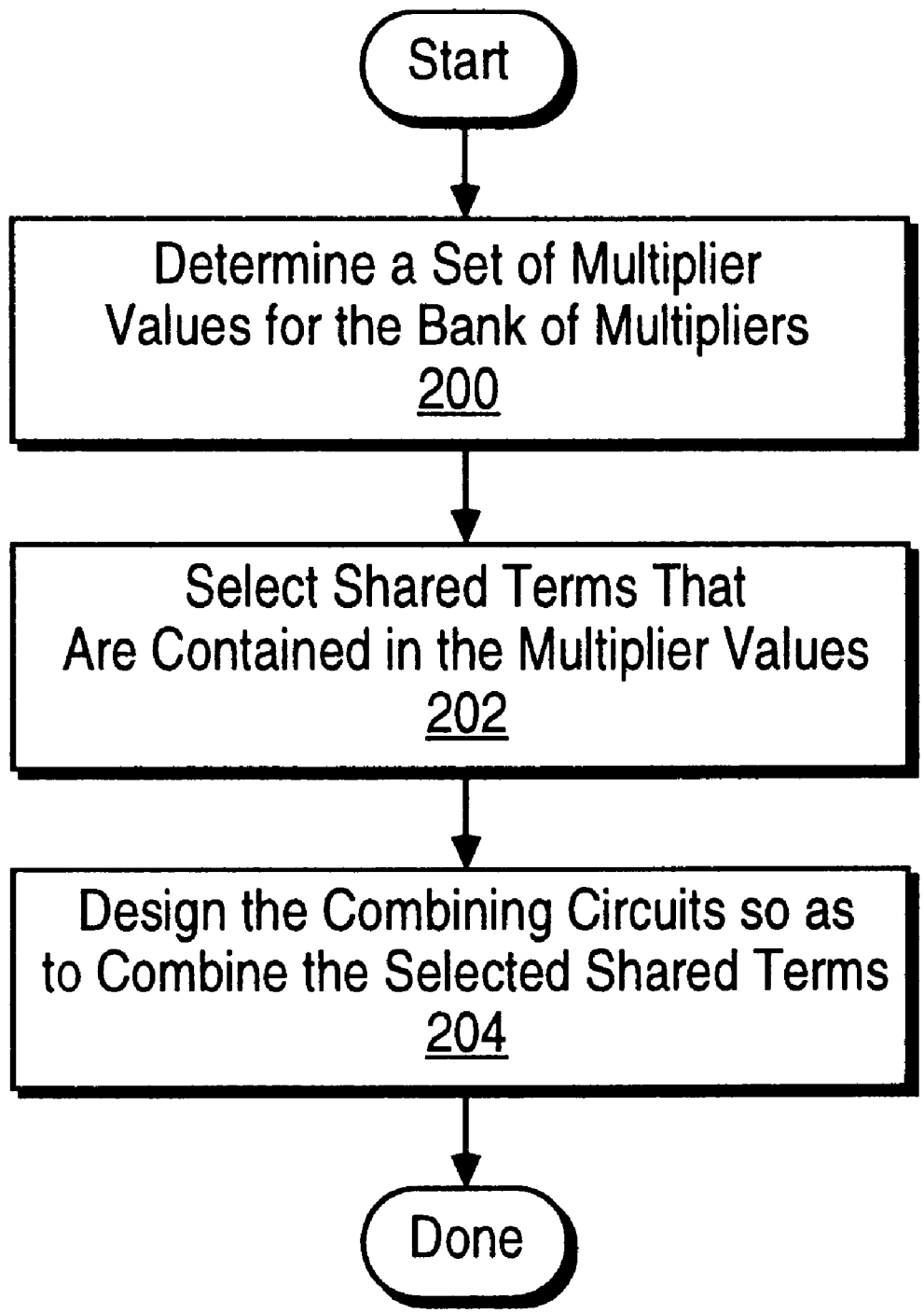

REDUCING THE HARDWARE COST OF A BANK OF MULTIPLIERS BY COMBINING SHARED TERMS

BACKGROUND OF THE INVENTION

1. Field of Invention

The present invention pertains to the field of digital systems. More particularly, this invention relates to reducing the hardware costs of a bank of multipliers.

2. Art Background

A wide variety of digital systems commonly include banks of multipliers which serve a variety of functions. For example, a digital filter commonly includes a bank of multipliers which is used to multiply a filter input signal by a set of filter coefficients. In addition, fast Fourier transform (FFT) circuits, discrete Fourier transform (DFT) circuits, and image processing circuits commonly include banks of multipliers.

Typically, each multiplier in a bank of multipliers is implemented with a set of adders. In the case of a digital filter, the number of adders needed for a multiplier is usually equal to the number of "one" bits in the corresponding filter coefficient if the filter coefficients are constant.

It is usually desirable in a digital system to minimize the number of adders needed to implement a bank of multipliers. A reduction in the number of adders typically reduces the integrated circuit space required to implement the bank of multipliers and thereby reduces the overall cost and complexity of the digital system.

SUMMARY OF THE INVENTION

A circuit that performs the function of a bank of multipliers while reducing hardware costs in disclosed. The circuit includes a shared term generator that generates a set of shared terms in response to an input value. The circuit further includes a set of combining circuits each of which generates a result term by combining one or more of the shared terms so that the result term equals the input value multiplied by a corresponding multiplication value. The circuit generates the share terms once and then reuses the shared terms in differing combining circuits as needed thereby eliminating the duplication of terms which is found in prior bank of multiplier circuits.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 4 shows a digital filter which includes a bank of multipliers realized by the present techniques;

FIG. 5 illustrates a method for designing a circuit that provides the functionality of a bank of multipliers while reducing hardware costs.

DETAILED DESCRIPTION

Figure 1:
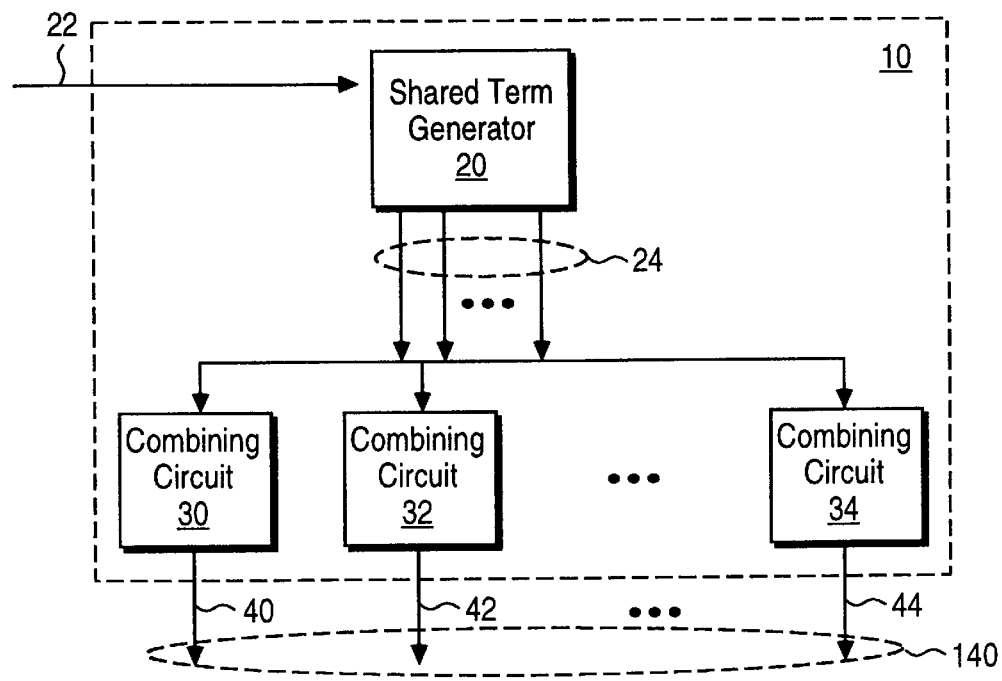
FIG. 1 shows a circuit which provides the functionality of a bank of multipliers while minimizing hardware costs.

FIG. 1 shows a circuit 10 which provides the functionality of a bank of multipliers while minimizing hardware costs.

The circuit 10 may be used to provide the functionality of a bank of multipliers in a variety of applications including digital filters, FFT circuits, DFT circuits, and image processing circuits to name a few examples.

The circuit 10 receives an input value on an input path 22 and in turn generates a set of result values on a set of result paths 40–44. The result values on the result paths 40–44 equal the input value on the input path 22 multiplied by a set of multiplier values which are associated with a bank of multipliers. For example, the result value on the result path 40 equals the input value multiplied by a particular multiplier value. Similarly, the result value on the result path 42 equals the input value multiplied by another particular multiplier value.

The circuit 10 includes a shared term generator 20 and a set of combining circuits 30–34. The shared term generator 20 generates a set of shared terms 24 in response to an input value on the input path 22. The shared terms 24 are provided as inputs to the combining circuits 30–34. The combining circuits 30–34 combine the shared terms 24 in a predetermined manner depending upon the corresponding multiplier values. The multiplier values are determined by an arrangement of circuitry in the combining circuits 30–34.

The shared term generator 20 generates the shared terms 24 by multiplying an input value on the input path 22 by a set of predetermined values. In one embodiment, the predetermined values are 1, 3, 5, and 7. In this embodiment, the shared terms 24 include a term equal to the input value on the input path 22, a term equal to 3 times the input value on the input path 22, a term equal to 5 times the input value on the input path 22, and a term equal to 7 times the input value on the input path 22.

The multiplier values associated with the combining circuits 30–34 may be referred to as $m_1$–$m_n$ where n is the number of combining circuits 30–34. The result values on the result paths 40–44 are the products of $m_1$ and the input value on the input path 22, $m_2$ and the input value on the input path 22, and $m_n$ and the input value on the input path 22, respectively.

The following examples employ base 2 and 2's complement arithmetic. Nevertheless, the techniques disclosed herein are readily modifiable for use with bases other than base 2. Assume, for example, in the following description that n=3 and the multiplier values associated with the combining circuits 30–34 are as follows:

$m_1$=1010110111

$m_2$=0110010011

$m_3$=1011100101

An examination of $m_1$ shows the following possible recognition of the shared terms 24 contained within $m_1$. Note that an underline indicates one of the shared terms 24:

$m_1$=101 0 11 0 111

Thus, $m_1$ can be viewed as a combination of a "5" shared term and a "3" shared term and a "7" shared term, multiplied, i.e. shifted by the appropriate number of bits. Thus, the result term 40 ($R_1$) is given by $R_1 = \underline{5}*2^7 + \underline{3}*2^4 + \underline{7}.$ Note that the multiplication of the shared terms "5" and "3" by powers of 2 can be implemented by the appropriate routing of individual bit lines of the data paths that carry the shared terms 24 and need not require extra hardware.

Figure 2:
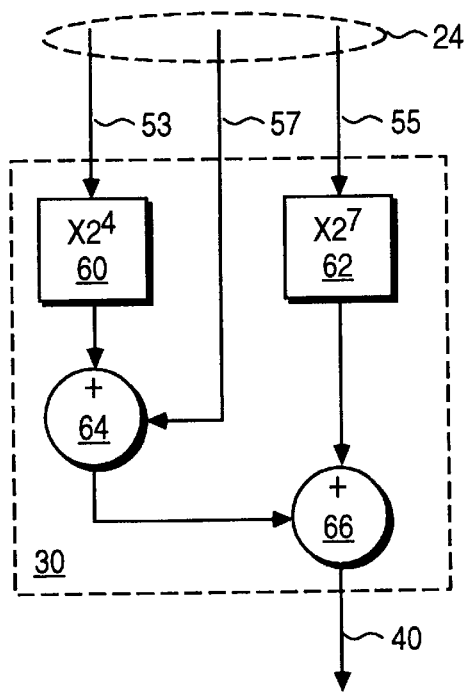
FIG. 2 illustrates an implementation of a combining circuit which is based upon a particular recognition of shared terms contained in a corresponding multiplication value.

FIG. 2 illustrates an implementation of the combining circuit 30 based upon the recognition of shared terms in $m_1$ shown above. The combining circuit 30 is coupled to a data path 53 that carries the "3" shared term and to a data path 55 that carries the "5" shared term and to a data path 57 that carries the "7" shared term from the shared term generator 20.

The combining circuit 30 includes a shift block 60 (X2⁴) that generates the 3*2⁴ term of R₁ and a shift block 62 (X2⁷) that generates the 5*2⁷ term of R₁. The combining circuit 30 includes an adder 64 that combines the 3*2⁴ term from the output of the shift block 60 with the "7" shared term on the data path 57 and an adder 66 that combines the result from the adder 64 with the 5*2⁷ term from the output of the shift block 62 to provide the result term 40.

The shift blocks 60–62 provide shift operations using signal line routing. For example, the shift block 60 routes the bit lines 0 through x of the data path 53 to input bit lines 4 through x+4 of the input of the adder 64, where bit 0 is the least significant bit and bit x is the most significant bit. Similarly, the shift block 62 routes the bit lines 0 through x of the data path 55 to input bit lines 7 through x+7 of the input of the adder 66. These are essentially multiplication operations for powers of 2 using signal routing to provide bit shifting.

An alternative examination of m₁ shows the following alternate recognition of the shared terms 24 contained within m₁. Note that an underline indicates one of the shared terms 24:

m₁=1 0 101 101 11

In this alternative view, m₁ is a combination of a "1" shared term and a "5" shared term, used twice, and a "3" shared term, multiplied, i.e. shifted by the appropriate number of bits. Thus, the result term 40 (R₁) is given by

R₁=1*2⁹+5*2⁵+5*2²+3.

This alternative view may not be preferable since it would require 3 adders in the implementation of the combining circuit 30 whereas the recognition of shared terms the implementation of which is shown in FIG. 2 required only 2 adders. In general, the number of adders required in an implementation of one of the combining circuits 30–34 equals the number of shared terms 24 selected from the corresponding $m_n$ value minus one.

There are many possible shared terms 24 to optimize hardware and combinations of the shared terms 24 that may be selected to realize the result terms 40–44 given the multiplier values $m_n$—$m_n$. It is generally desirable to select the shared terms 24 so as to minimize the number of adders that need to be implemented in the combining circuits 30–34.

Figure 3:
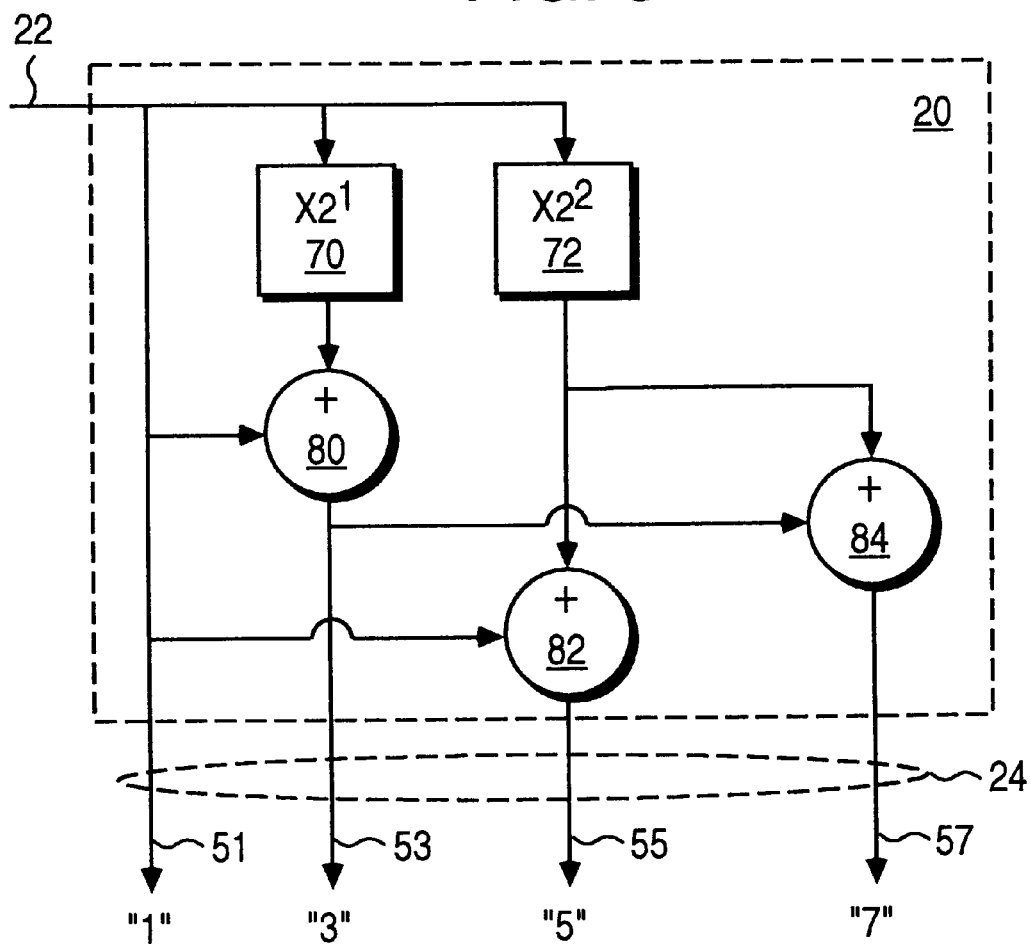
FIG. 3 illustrates the shared term generator in one embodiment.

FIG. 3 illustrates the shared term generator 20 in one embodiment. The "1" shared term on the data path 51 is provided by the input value carried on the input path 22. A shift block 70 (X2¹) multiplies the input value on the input path 22 by 2 and an adder 80 adds the input value on the input path 22 to the output of the shift block 70 which yields the "3" shared term on the data path 53. A shift block 72 (X2²) multiplies the input value on the input path 22 by 4 and an adder 82 adds the data value on the input path 22 to the output of the shift block 72 which yields the "5" shared term on the data path 55. An adder 84 adds the "3" shared term on the data path 53 to the output of the shift block 72 which yields the "7" shared term on the data path 57. The shift blocks 70 and 72 require no additional hardware.

FIG. 4 shows a digital filter 100 which includes a bank of multipliers realized by the circuit 10. The input path 22 carries an input signal for the digital filter 100 which includes a series of digital data values. The result values provided on the result paths 140 from the circuit 10 provide inputs to a set of filter taps of the digital filter 10. The filter taps correspond to a set of delay elements 110–116. The digital filter 100 includes a set of adders 120–124 that add the result values to outputs of the delay elements 110–114. The output of the last delay element 116 provides an output signal 130 for the digital filter 100.

The digital filter 100 is characterized by a set of constant filter coefficients $w_1$–$w_n$. The transfer function of the digital filter 100 may be represented as follows:

$$y_k = \sum_{i=1}^{n} w_i x_{k-i}$$

where $w_i$ are the filter coefficients, $X_k$ is the filter input signal on the input path 22, and $y_k$ is the output signal 130.

The result values on the result paths 140 carry the $w_i x_{k-i}$ terms in response to the $x_k$ signal on the input path 22. The combining circuit 30 provides the $w_1$ multiplication, the combining circuit 32 provides the $w_2$ multiplication, and so on. For example, the implementation of the combining circuit 30 is determined by the recognition of the shared terms 24 which are contained in the filter coefficient $w_1$ in the manner described above.

FIG. 5 illustrates a method for designing a circuit that provides the functionality of a bank of multipliers while reducing hardware costs. Initially, a shared term generator is designed which provides a preselected set of shared terms. The preselected shared terms may be 1, 3, 5, and 7 as set forth above, or a subset of these terms, or may include additional terms.

At step 200, a set of multiplier values $m_1$–$m_n$ is selected for the bank of multipliers. This step is generally application dependent. For example, if the application being designed is a digital filter, then the multiplier values $m_1$–$m_n$ are the filter coefficients for the desired transfer function.

At step 202, a set of shared terms are selected from each multiplier value $m_1$–$m_n$. As discussed above, a variety of selections or recognitions of shared terms may be available in a given multiplier value $m_1$–$m_n$. It is generally desirable to select the shared terms such that the fewest possible number of shared terms are combined so that the fewest number of adder circuits will be required to implement the corresponding combining circuits.

At step 204, the combining circuits are designed to implement the multiplier values $m_1$–$m_n$. This step may involve specifying the number of adders and the signal path routing required to perform the associated shifting and adding operations.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A circuit that performs the function of a bank of multipliers which generates a plurality of result values by multiplying an input value by each of a plurality of multiplier values in the bank, comprising:

shared term generator that generates a set of terms involving the input value;

a set of combining circuits each of which is adapted to generate a corresponding one of the result values and which collectively share the terms generated by the shared term generator, each combining circuit generating the corresponding result value by combining one or more of the terms generated by the shared term generator.

2. The circuit of claim 1, wherein the shared term generator includes circuitry for generating the terms by multiplying the input value by a set of preselected data values.

3. The circuit of claim 2, wherein the preselected data values are preselected to enable the combining circuits to generate the result values by performing shift and add operations on one or more of the terms.

4. The circuit of claim 3, wherein the preselected data values include a value equal to one.

5. The circuit of claim 3, wherein the preselected data values include a value equal to three.

6. The circuit of claim 3, wherein the preselected data values include a value equal to five.

7. The circuit of claim 3, wherein the preselected data values include a value equal to seven.

8. The circuit of claim 3, wherein each combining circuit comprises:
   a set of adder circuits for combining one or more of the terms;
   circuitry for providing appropriate bits of one or more of the terms to appropriate input bits of the adder circuits depending upon an arrangement of the terms within the corresponding multiplication value.

9. A digital filter having a circuit that provides a set of filter taps for the digital filter by multiplying an input signal to the digital filter by each of a plurality of filter coefficients of the digital filter wherein the circuit comprises:
   shared term generator that generates a set of terms that involve the input signal;
   a set of combining circuits each of which is adapted to generate a corresponding one of the filter taps and which collectively share the terms generated by the shared term generator, each combining circuit generating the corresponding filter tap by combining one or more of the terms generated by the shared term generator.

10. The digital filter of claim 9, wherein each combining circuit corresponds to a particular one of the filter coefficients.

11. The digital filter of claim 9, wherein the shared term generator includes circuitry for generating the terms by multiplying the input signal by a set of preselected data values.

12. The digital filter of claim 11, wherein the preselected data values are preselected to enable the combining circuits to provide the filter taps by performing shift and add operations on one or more of the terms.

13. The digital filter of claim 12, wherein the preselected data values include a value equal to one.

14. The digital filter of claim 12, wherein the preselected data values include a value equal to three.

15. The digital filter of claim 12, wherein the preselected data values include a value equal to five.

16. The digital filter of claim 12, wherein the preselected data values include a value equal to seven.

17. The digital filter of claim 12, wherein each combining circuit comprises:
   a set of adder circuits for combining one or more of the shared terms;
   circuitry for providing appropriate bits of one or more of the terms to appropriate input bits of the adder circuits depending upon an arrangement of the terms within the corresponding filter coefficient.

18. A method for providing a circuit that performs the function of a bank of multipliers which generates a plurality of result values by multiplying an input value by each of a plurality of multiplier values in the bank, comprising the steps of:
   determining the multiplier values for the bank of multipliers;
   selecting a set of terms that are contained in the multiplier values;
   providing a set of combining circuits and adapting each to a corresponding one of the result values and collectively sharing the terms among the combining circuits such that each combining circuit generates the corresponding result value by combining one or more of the terms.

19. The method of claim 18, further comprising the step of providing a circuit that generates the terms in response to the input value.

20. The method of claim 19, wherein the step of providing a circuit that generates the terms includes the step of providing circuitry for generating the terms by multiplying the input value by each of a set of data values.

21. The method of claim 20, further comprising the step of selecting the data values so as to enable the combining circuits to generate the result values by performing shift and add operations on one or more of the terms.

22. The method of claim 21, wherein the step of selecting the data values includes that step of selecting a value equal to one.

23. The method of claim 21, wherein the step of selecting the data values includes that step of selecting a value equal to three.

24. The method of claim 21, wherein the step of selecting the data values includes that step of selecting a value equal to five.

25. The method of claim 21, wherein the step of selecting the data values includes that step of selecting a value equal to seven.

* * * * *